US 12,034,361 B2

(12) United States Patent
van der Heijden et al.

(10) Patent No.: US 12,034,361 B2
(45) Date of Patent: Jul. 9, 2024

(54) CONTROLLER FOR A DC-DC CONVERTER (71) Applicant: NXP B.V., Eindhoven (NL)

(72) Inventors: Wouter van der Heijden, Nijmegen (NL); Edwin Schapendonk, Brabant (NL); Henricus Cornelis Johannes Buthker, Mierlo (NL); Henri Verhoeven, Someren (NL); Oswald Moonen, Eindhoven (NL); Ton van Deursen, Best (NL)

(73) Assignee: NXP B.V., Eindhoven (NL)

( * ) Notice: Subject to any disclaimer, the term of this patent is extended or adjusted under 35 U.S.C. 154(b) by 47 days.

(21) Appl. No.: 17/658,342

(22) Filed: Apr. 7, 2022

(65) Prior Publication Data
US 2022/0329150 A1 Oct. 13, 2022

(30) Foreign Application Priority Data

Apr. 9, 2021 (EP) ...................................... 21167743

(51) Int. Cl.
*H02M 1/00* (2007.01)
*H02M 3/155* (2006.01)

(52) U.S. Cl.
CPC ......... *H02M 1/0032* (2021.05); *H02M 3/155* (2013.01)

(58) Field of Classification Search
CPC ............. H02M 1/0022; H02M 1/0032; H02M 3/155–1588
See application file for complete search history.

(56) References Cited

U.S. PATENT DOCUMENTS

| | | | |
|---|---|---|---|
| 10,389,243 B2 | 8/2019 | Chakkirala | |
| 2012/0223693 A1 | 9/2012 | Tang et al. | |
| 2015/0214841 A1* | 7/2015 | Ramorini | H02M 3/158 323/271 |
| 2015/0381044 A1* | 12/2015 | Bodano | H02M 3/1588 323/271 |
| 2016/0087532 A1 | 3/2016 | Stanzione | |
| 2016/0359409 A1 | 12/2016 | Theoduloz et al. | |
| 2020/0227767 A1 | 7/2020 | Verhoeven et al. | |
| 2021/0126535 A1* | 4/2021 | Esch | H02M 1/08 |

OTHER PUBLICATIONS

Wang, et al.: "A Constant Current Digital Control Method for Primary-Side Regulation Active-Clamp Flyback Converter", IEEE Transactions on Power Electronics, vol. 36, Issue: 6, Jun. 2021, 01 Publication—Dec. 2020, pp. 2934-2938.

* cited by examiner

*Primary Examiner* — Fred E Finch, III (57) ABSTRACT

A controller for a DC-DC converter that includes an inductor. The DC-DC converter has three phases of operation: a first phase, in which an input voltage charges the inductor; a second phase, in which the inductor discharges to a load; and a third phase, in which the inductor is disconnected from the load and in which the input voltage does not charge the inductor. The controller is configured to set a control-factor based on the input voltage of the DC-DC converter, and set the duration of the third phase based on the control-factor and the sum of the duration of the first phase and the second phase.

16 Claims, 5 Drawing Sheets

CONTROLLER FOR A DC-DC CONVERTER

CROSS-REFERENCE TO RELATED APPLICATIONS

This application claims the priority under 35 U.S.C. § 119 of European Patent application no. 21167743.0, filed on 9 Apr. 2021, the contents of which are incorporated by reference herein.

FIELD

The present disclosure relates to a controller for DC-DC converter that has a first phase, a second phase and a third phase of operation.

SUMMARY

According to a first aspect of the present disclosure there is provided a controller for a DC-DC converter that includes an inductor;
wherein the DC-DC converter has three phases of operation:
   a first phase, in which an input voltage charges the inductor;
   a second phase, in which the inductor discharges to a load; and
   a third phase, in which the inductor is disconnected from the load, and in which the input voltage does not charge the inductor;
wherein the controller is configured to:
   set a control-factor based on the input voltage of the DC-DC converter; and
   set the duration of the third phase based on:
      the control-factor; and
      the sum of the duration of the first phase and the second phase.

Such a controller can advantageously apply a linear relationship between the control-factor and the average input current. The use of a linear relationship can significantly reduce the complexity of the controller and in turn the power consumption of the controller.

In one or more embodiments the controller is configured to set the duration of the third phase by applying a linear function to the sum of the duration of the first phase and the second phase.

In one or more embodiments the controller is configured to set the duration of the third phase, $t_3$, based on $$t_3 = \left(\frac{1}{p} - 1\right)(t_1 + t_2),$$

where p is the control-factor, $t_1$ is the duration of the first phase, and $t_2$ is the duration of the second phase.

In one or more embodiments the controller is configured to transition the DC-DC converter from the first phase to the second phase when the current through the inductor reaches a fixed peak-current value.

In one or more embodiments the controller is configured to transition the DC-DC converter from the second phase to the third phase in response to the current through the inductor being zero.

In one or more embodiments the controller is configured to operate the DC-DC converter using pulse frequency modulation control with a fixed peak current through the inductor.

In one or more embodiments the DC-DC converter is a boost converter.

In one or more embodiments the controller comprises a third-phase-end-circuit that is configured to provide a third-phase-end-signal for transitioning the DC-DC converter from the third phase to the first phase of a next cycle. The third-phase-end-circuit can be configured to:
   charge a capacitor from a first voltage to a second voltage during the first phase and the second phase;
   discharge the capacitor from the second voltage to the first voltage during the third phase; and
   set the rate of the discharge of the capacitor relative to the rate of the charge of the capacitor based on the control-factor.

In one or more embodiments the controller comprises a third-phase-end-circuit that is configured to provide a third-phase-end-signal for transitioning the DC-DC converter from the third phase to the first phase of a next cycle. The third-phase-end-circuit can comprise:
   a comparator having a comparator-first-input-terminal, a comparator-second-input-terminal and a comparator-output-terminal, wherein the comparator-output-terminal is configured to provide the third-phase-end-signal;
   a first current source and a timing-switch connected in series with each other between the comparator-first-input-terminal and a first supply rail;
   a second current source connected in series between the comparator-first-input-terminal and a second supply rail, wherein the controller is configured to set the level of the current provided by the second current source based on the control-factor;
   a capacitor connected in series between the comparator-first-input-terminal and the second supply rail; and
   a reference-voltage-source configured to provide a reference voltage to the comparator-second-input-terminal.
The controller can be configured to:
   set the timing-switch such that it is conductive during the first phase and the second phase of the DC-DC converter; and
   set the timing-switch such that it is not conductive during the third phase of the DC-DC converter.

In one or more embodiments the first current source provides a current with a constant level.

In one or more embodiments the controller comprises a third-phase-end-circuit that is configured to provide a third-phase-end-signal for transitioning the DC-DC converter from the third phase to the first phase of a next cycle. The third-phase-end-circuit can be configured to:
   count from a first value to a second value during the first phase and the second phase;
   count from the second value to the first value during the third phase; and
   set the speed of the count from the first value to the second value relative to the speed of the count from the second value to the first value based on the control-factor.

In one or more embodiments organic matter is configured to provide the input voltage.

There is also disclosed a system comprising:
   a DC-DC converter that includes an inductor, wherein the DC-DC converter has three phases of operation:
      a first phase, in which an input voltage charges the inductor;
      a second phase, in which the inductor discharges to a load; and
      a third phase, in which the inductor is disconnected from the load, and in which the input voltage does not charge the inductor;

any controller disclosed herein.

In one or more embodiments the system further comprises: organic matter that is configured to provide the input voltage.

According to a further aspect of the disclosure, there is provided a method of operating a DC-DC converter that includes an inductor, wherein the DC-DC converter has three phases of operation:
- a first phase, in which an input voltage charges the inductor;
- a second phase, in which the inductor discharges to a load; and
- a third phase, in which the inductor is disconnected from the load, and in which the input voltage does not charge the inductor;
the method comprising;
setting a control-factor based on the input voltage of the DC-DC converter; and
setting the duration of the third phase based on:
- the control-factor; and
- the sum of the duration of the first phase and the second phase.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

Figure 1A:
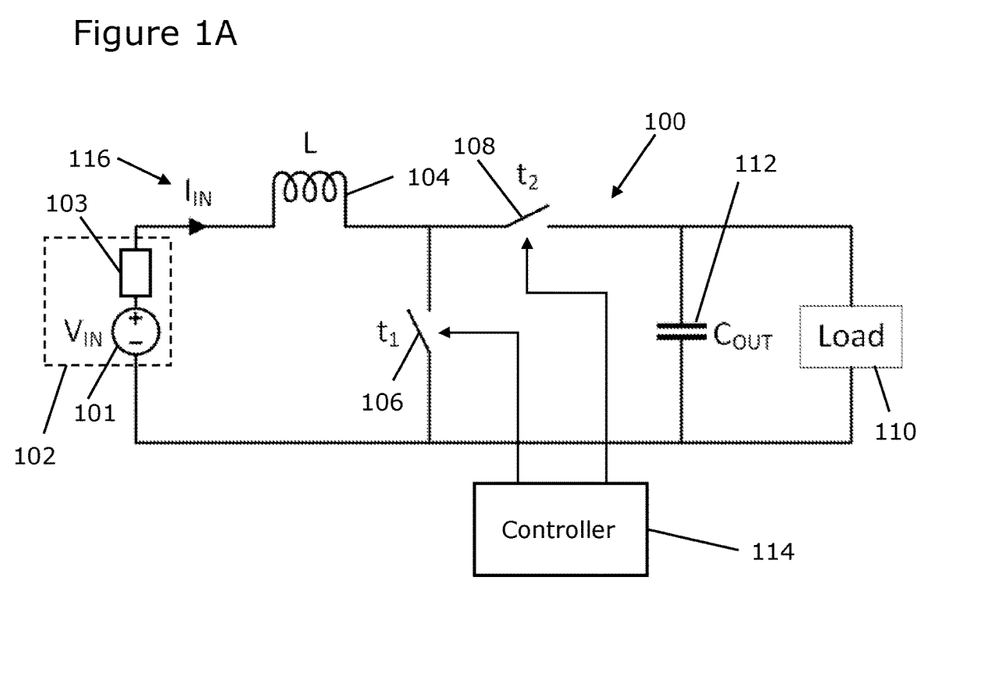
FIG. 1A shows a DC-DC converter, which in this example is a boost converter.

FIG. 1A shows a DC-DC converter, which in this example is a boost converter 100. However as indicated below, controllers described herein can be used with other types of DC-DC converters.

The boost converter 100 includes a source 102 that provides an input voltage ($V_{IN}$), which is represented as a voltage source 101 and a source impedance 103. As will be discussed below, examples disclosed herein are particularly useful for sources 102 that provide an input voltage. For instance, it is known that organic matter can provide a voltage supply in the range of between 0.4V and 0.9V, with a current up to 1 mA (e.g., a living plant power source may generate 0.66V at 0.5 mA). Further details of such organic matter voltage sources can be found in US 2020/0227767 A1. To this end, organic matter can provide any of the input voltages ($V_{IN}$) described herein.

The boost converter 100 includes an inductor 104, which in some applications can be referred to as a power inductor. A first terminal of the inductor 104 is connected to a first terminal of the source 102. A second terminal of the inductor 104 is connected to the first terminal of a charging-switch 106. A second terminal of the charging-switch 106 is connected to a second terminal of the source 102. As will be discussed below, the boost converter 100 can be operated in a first phase of operation when the charging-switch 106 is closed/conducting such that the input voltage ($V_{IN}$) charges the inductor 104.

The boost converter 100 also includes a discharge-switch 108. A first terminal of the discharge-switch 108 is connected to the second terminal of the inductor 104. A second terminal of the discharge-switch 108 is connected to a first terminal of a load 110. A second terminal of the load 110 is connected to the second terminal of the source 102. As will be discussed below, the boost converter 100 can be operated in a second phase of operation when the discharge-switch 108 is closed/conducting such that the inductor 104 discharges to the load 110.

In this example, an output capacitor ($C_{OUT}$) 112 is also connected in parallel with the load 110 to smooth the output voltage that is provided to the load 110.

FIG. 1A also shows a controller 114 that selectively opens and closes the charging-switch 104 and the discharge-switch 108. The boost converter 100 is controlled such that it has three phases of operation:
- a first phase, in which an input voltage charges the inductor 104. In FIG. 1A the boost converter 100 is in the first phase when the charging-switch 106 is closed/conducting, and the discharge-switch 108 is open/non-conducting;
- a second phase, in which the inductor 104 discharges to the load 110. In FIG. 1A the boost converter 100 is in the second phase when the discharge-switch 108 is closed/conducting, and the charging-switch 106 is open/non-conducting; and
- a third phase, in which the inductor 104 is disconnected from the load 110, and in which the input voltage does not charge the inductor 104. In FIG. 1A the boost converter 100 is in the third phase when the charging-switch 106 is open/non-conducting, and the discharge-switch 108 is also open/non-conducting.

Figure 1B:
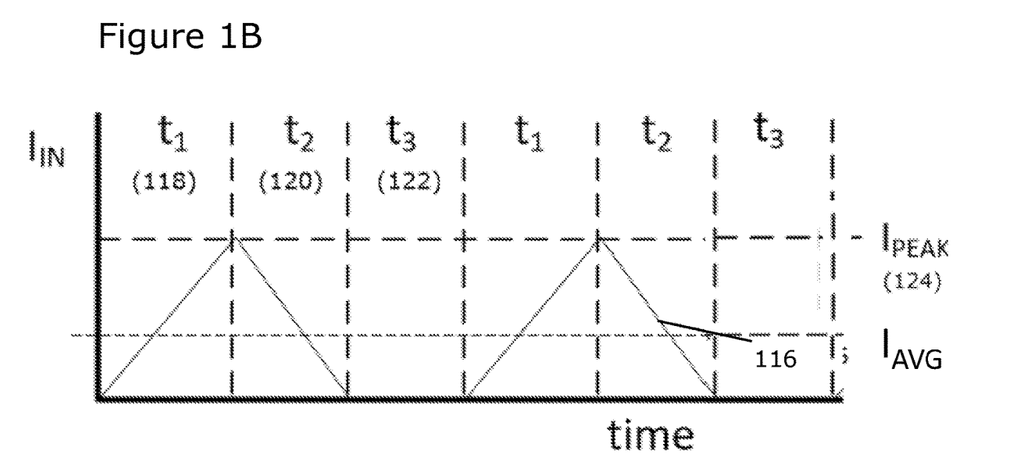
FIG. 1B shows the input current that is drawn from the source of FIG. 1A during operation of the boost converter in discontinuous current mode.

FIG. 1B shows the input current ($I_{IN}$) 116 that is drawn from the source 102 during operation of the boost converter 100. The first phase of operation has a duration of $t_1$ 118, the second phase of operation has a duration of $t_2$ 120, and the third phase of operation has a duration of $t_3$ 122. During the first phase $t_1$ 118, the input current $I_{IN}$ 116 increases as the inductor 104 is charged until the input current 116 reaches $I_{PEAK}$ 124. During the second phase $t_2$ 120, the input current $I_{IN}$ 116 decreases as the inductor 104 is discharged until the input current $I_{IN}$ 116 reaches zero. The third phase $t_3$ 122 can be referred to as a variable dead-time, in that there is no significant input current $I_{IN}$ 116 and the duration of the third phase $t_3$ 122 is variable.

The controller 114 controls the state of the charging-switch 106 and the discharge-switch 108 in order to transition the boost converter 100 from the first phase $t_1$ 118 to the second phase $t_2$ 120 when the current ($I_{IN}$ 116) through the inductor 104 reaches a fixed peak-current value ($I_{PEAK}$ 124). The duration of the first phase $t_1$ 118 is dependent on the input voltage $V_{IN}$ and the inductance of the inductor 104. Such control is well-known in the art. For instance a sense resistor can be used to provide a signal to the controller 114 that is used to determine when to transition from the first phase $t_1$ 118 to the second phase $t_2$ 120. Alternatively, the controller 114 can measure the input voltage and make $t_1$ proportional to it. This, in combination with a fixed inductor value, will result in a fixed peak current.

The controller 114 controls the state of the charging-switch 106 and the discharge-switch 108 in order to transition the DC-DC converter from the second phase $t_2$ 120 to the third phase $t_3$ 122 in response to the current ($I_{IN}$ 116) through the inductor 104 being zero. By way of example, the controller 114 can identify such a zero crossing of the current $I_{IN}$ 116 by: applying zero current detection; measuring the voltage over the discharge-switch 108; estimating the inductor current using an integrator; and detecting when the current goes negative. The duration of the second phase $t_2$ 120 is dependent on the output voltage (more particularly the difference between the input voltage and the output voltage) and the inductance of the inductor 104.

Operation of the boost converter 100 in this way can be considered as using pulse frequency modulation (PFM) control with a fixed peak current $I_{PEAK}$ 124 through the inductor 104. In this example, as will be described below, the controller 114 applies PFM control to regulate the DC input current $I_{IN}$ 116 to a fractional value of a fixed peak current $I_{PEAK}$ 124.

For many sustainable power sources (solar panels, energy harvesters, etc.) it is beneficial to use a maximum power point tracking (MPPT) algorithm to optimize the source-load matching between the (power/voltage) source 102 and a DC-DC converter (in FIG. 1A the boost converter 100) that is connected to the (power/voltage) source 102. In this way, the DC-DC/boost converter 100 can be considered as a load for the sustainable (power/voltage) source 102. Especially in energy harvesters that generate power from organic matter and also IoT (internet of things) devices, where the power levels are extremely low, the complexity and power consumption of using an MPPT algorithm may not be justified or even possible.

Advantageously, examples disclosed herein include a controller 114 that can provide a mechanism for regulating a DC-DC converter for setting the average value of the input current. By regulating the average input current ($I_{IN}$) based on the input voltage ($V_{IN}$), the input power can be regulated to an optimum value using a maximum power point tracking (MPPT) algorithm. The controllers described herein are thus an enabler for such an algorithm.

According to examples disclosed herein, the average value of the input current can be set by varying the duration of the third phase $t_3$ 122. (This is in contrast to an alternative controller that varies the duration of the third phase $t_3$ 122 in order to regulate the output current or voltage of the boost converter 100.) Furthermore, as will be discussed below, the controller 114 can provide for a linear relationship between the duration of the third phase $t_3$ 122 and the average input current ($I_{IN}$) 116. This can significantly simplify the implementation of the controller 114, which in turn can reduce the power consumption of the controller 114 down to a level that is feasible for low voltage, low current applications.

The average input current ($I_{AVG}$) of the waveform shown in FIG. 1B is given by:

$$I_{AVG} = \left(\frac{I_{PEAK}}{2}\right)\left(\frac{t_1+t_2}{t_1+t_2+t_3}\right) \quad (1)$$

As can be seen from the above equation, the average current, as a function of $t_3$ (that is: $I_{AVG}(t_3)$) is highly non-linear. Therefore in some applications, especially low power applications, it can be prohibitively complicated to control the average input current $I_{AVG}$ by adjusting the duration of the third phase $t_3$ 122. This is because any such control will have to be able to account for the non-linear relationship between the duration of the third phase $t_3$ 122 (which is set by the controller 114) and the average input current $I_{IN}$ 116 (which is to be regulated to a desired value).

The inventors have found that the relationship between $t_3$ and $I_{AVG}$ can be improved (in terms of the ability to implement the controller 114) by making $t_3$ a function of $t_1$ and $t_2$. Particularly when:

$$t_3 = \left(\frac{1}{p} - 1\right)(t_1+t_2) \quad (2)$$

The function for $I_{AVG}$ will be linear with respect to p.

$$I_{AVG} = p\frac{I_{PEAK}}{2} \quad (3)$$

Where p will be referred to as a control-factor or a proportional-factor.

In this way, the controller 114 can set the control-factor p based on the input voltage ($V_{IN}$) of the boost converter 100 in order to achieve an acceptable power transfer, in some examples maximum power transfer. The controller 114 can then set the duration of the third phase $t_3$ 122 based on: (i) the control-factor p; and (ii) the sum of the duration of the first phase and the second phase ($t_1+t_2$) in line with equation (2) above.

More particularly, in some examples the controller 114 can set the duration of the third phase, $t_3$, based on $$t_3 = \left(\frac{1}{p} - 1\right)(t_1+t_2),$$

where p is the control-factor, $t_1$ is the duration of the first phase, and $t_2$ is the duration of the second phase.

Furthermore, such operation advantageously enables the controller 114 to apply a linear relationship between the control-factor p and the average input current in line with equation (3) above. As indicated above, the use of a linear relationship can significantly reduce the complexity of the controller 114 and in turn the power consumption of the controller 114.

Figure 2A:
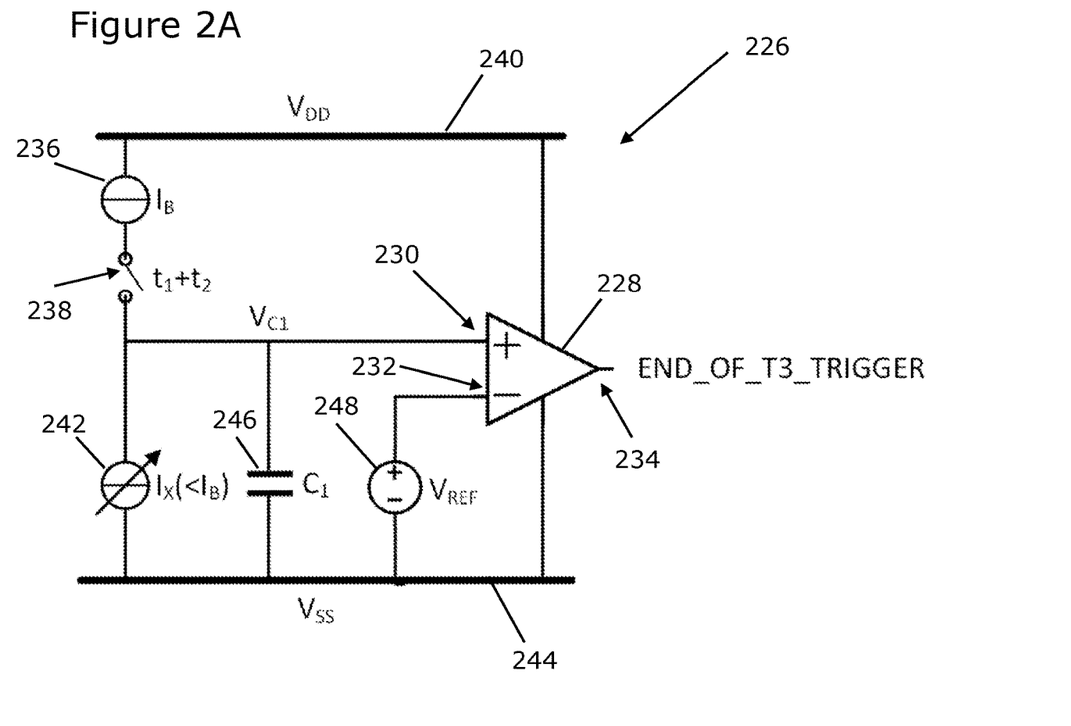
FIG. 2A shows an example of a third-phase-end-circuit that is one example of an analogue implementation for providing some of the functionality of the controller of FIG. 1A.
Figure 3A:
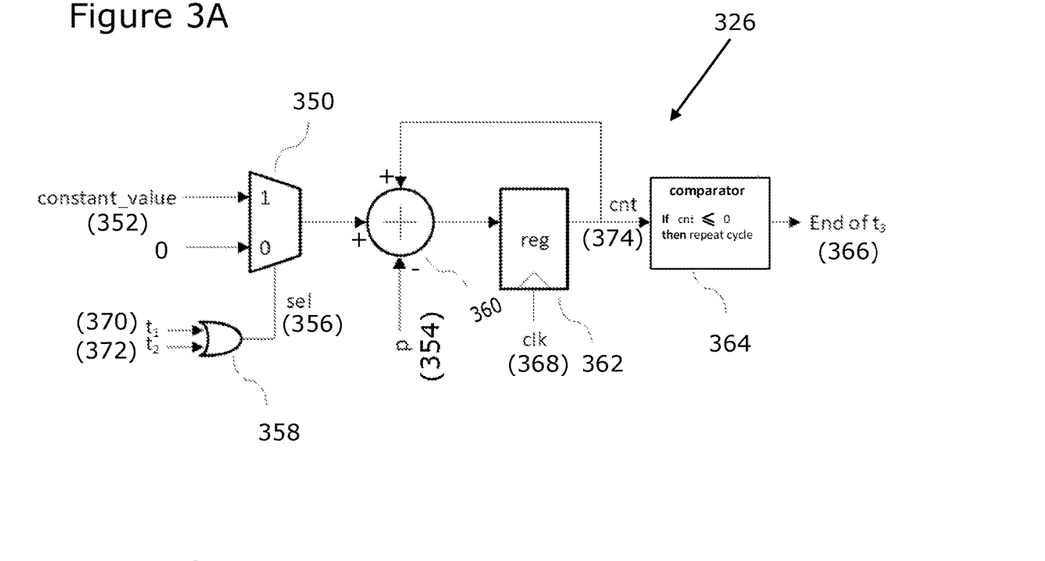
FIG. 3A shows an example of a third-phase-end-circuit that is one example of a digital implementation for providing some of the functionality of the controller of FIG. 1A.
Figure 4A:
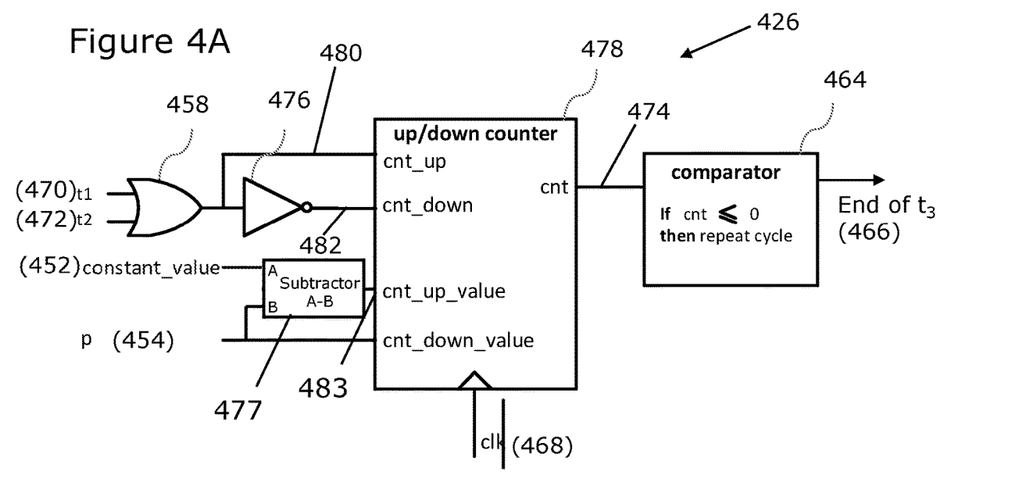
FIG. 4A shows an example of a third-phase-end-circuit that is another example of a digital implementation for providing some of the functionality of the controller of FIG. 1A.

The controller 114 can be implemented such that it determines the duration of the third phase $t_3$ 122 in either the digital or analogue domain, as will be described below. An example of an analogue implementation is shown in FIG. 2A, and two examples of digital implementations are shown in FIGS. 3A and 4A. It will be appreciated that these implementations are not limiting because the associated functionality can be readily achieved with alternative circuits.

FIG. 2A shows an example of a third-phase-end-circuit 226 that is one example of an analogue implementation for providing some of the functionality of the controller of FIG. 1A. More particularly, the third-phase-end-circuit 226 provides a third-phase-end-signal (labelled as END_OF_T3_TRIGGER in FIG. 2A) for transitioning the DC-DC converter from the third phase to the first phase of a next cycle.

The third-phase-end-circuit 226 includes a comparator 228, which has: a comparator-first-input-terminal 230 (in this example a non-inverting input-terminal); a comparator-second-input-terminal 232 (in this example an inverting input-terminal); and a comparator-output-terminal 234. The comparator-output-terminal 234 provides the third-phase-end-signal (END_OF_T3_TRIGGER).

A reference-voltage-source 248 is included to provide a reference voltage $V_{REF}$ to the comparator-second-input-terminal 232.

The third-phase-end-circuit 226 also includes a first current source 236, which in this example is a constant current source in that it provides a current with a constant level. The current provided by the first current source 236 is labelled as $I_B$ in FIG. 2A. The third-phase-end-circuit 226 also includes a timing-switch 238. The timing-switch 238 and the first current source 236 are connected in series with each other between the comparator-first-input-terminal 230 and a first supply rail 240. The controller is configured to operate the timing-switch 238 such that it is closed/conductive during the first phase $t_1$ and the second phase $t_2$ of the operation of the DC-DC converter, and such that it is open/non-conductive during the third phase $t_3$ of the operation of the DC-DC converter.

Also, the third-phase-end-circuit 226 includes a second current source 242 that is connected in series between the comparator-first-input-terminal 230 and a second supply rail 244. The second current source 242 is a variable current source in that it can provides a current with a variable level. The controller is configured to set the level of the current provided by the second current source 242 based on the control-factor. The current provided by the second current source 242 is labelled as $I_X$ in FIG. 2A. The relationship between $I_X$ and the control-factor will be described mathematically below. For this implementation, the current $I_X$ provided by the second current source 242 is less than the current $I_B$ provided by the first current source 236.

In this example, the third-phase-end-circuit 226 includes a storage element, in this example a capacitor 246, connected in series between the comparator-first-input-terminal 230 and the second supply rail 244. The capacitor 246 is used to store charge that it receives from one or both of the current sources 236, 242, and present a voltage ($V_{C1}$) at the comparator-first-input-terminal 230.

Figure 2B:
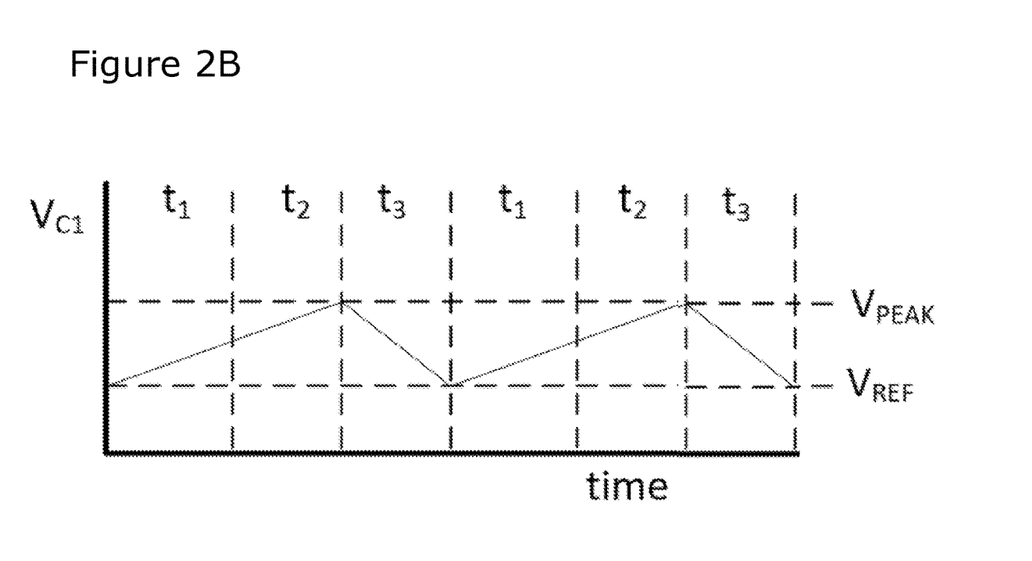
FIG. 2B shows a plot of the voltage at the comparator-first-input-terminal 230 of FIG. 2A.

FIG. 2B shows a plot of the voltage $V_{C1}$ at the comparator-first-input-terminal 230. When the timing-switch 238 is closed/conducting (during $t_1$ and $t_2$), the first current source 236 provides a current $I_B$ to charge the capacitor 246, and therefore increase the voltage at the comparator-first-input-terminal 230. When the timing-switch 238 is open/non-conducting (during $t_3$), the first current source 236 is disconnected from the capacitor 246, and therefore the capacitor 246 discharges and the voltage at the comparator-first-input-terminal 230 reduces.

In the periodic waveform of FIG. 2B, the voltage at the comparator-first-input-terminal 230 $V_{C1}$ is equal to the reference voltage $V_{REF}$ at the start of the first phase $t_1$. As described above, during $t_1$ and $t_2$ the timing-switch 238 is closed. As $I_B > I_X$, $V_{C1}$ will increase to a value labelled as $V_{PEAK}$, which is the value of $V_{C1}$ at the end of the second phase $t_2$.

$$V_{PEAK} = V_{REF} + \frac{(I_B - I_X)(t_1 + t_2)}{C_1} \quad (4)$$

At the start of the third phase $t_3$, the timing-switch 238 is opened and $V_{C1}$ will decrease. $V_{C1}$ reaches $V_{REF}$ when:

$$\partial V_C(t_1 + t_2) = -\partial V_C(t_3)$$

Substitution gives:

$$\frac{(I_B - I_X)(t_1 + t_2)}{C_1} = \frac{I_X}{C_1}(t_3)$$

Where $t_3$ can now be expressed as:

$$t_3 = \left(\frac{I_B}{I_X} - 1\right)(t_1 + t_2)$$

As soon as $V_C$ crosses the reference voltage $V_{REF}$, the third-phase-end-signal (END_OF_T3_TRIGGER) at the comparator-output-terminal 234 will go high, therefore indicating the end of the third phase $t_3$ such that the controller can close the charging-switch that is illustrated in FIG. 1A to start the first phase of a next cycle.

Substituting $t_3$ into the equation for $I_{AVG}$ yields:

$$I_{AVG} = \left(\frac{I_X}{I_B}\right)\frac{I_{PEAK}}{2} \quad (6)$$

By comparing equation (6) with equation (3), it can be seen that for the implementation of FIG. 2A the control-factor (p) is $I_X/I_B$; that is, the ratio of the current levels provided by the first and second current sources 236, 242. Therefore, advantageously setting the variable current $I_X$ provided by the second current source 242 results in a linear adjustment of the average input current ($I_{AVG}$). That is, a linear DC current control for a boost converted is achieved by controlling $I_X$ using a Current Digital to Analog Converter (CDAC).

More generally, one or more analogue implementations of a third-phase-end-circuit that provides a third-phase-end-signal for transitioning the DC-DC converter from the third phase to the first phase of a next cycle can be configured to:
  charge a capacitor (or other storage element) from a first voltage ($V_{REF}$ in FIG. 2B) to a second voltage ($V_{PEAK}$ in FIG. 2B) during the first phase and the second phase; and discharge the capacitor from the second voltage ($V_{PEAK}$ in FIG. 2B) to the first voltage ($V_{REF}$ in FIG. 2B) during the third phase; and set the rate of the discharge of the capacitor relative to the rate of the charge of the capacitor based on the control-factor (by setting the ratio of the current levels $I_X$ and $I_B$ provided by the first and second current sources 236, 242 in FIG. 2A).

FIGS. 3A and 4A show examples of a third-phase-end-circuit 326, 426 that are digital implementations for providing some of the functionality of the controller of FIG. 1A. More particularly, the third-phase-end-circuits 326, 426 provide a third-phase-end-signal for transitioning the DC-DC converter from the third phase to the first phase of a next cycle, as will be described in detail below.

The two digital implementations of FIGS. 3A and 4A can be summarised as being configured to:
count from a first value (similar to the first voltage, $V_{REF}$, of FIG. 2B) to a second value (similar to the second voltage, $V_{PEAK}$, of FIG. 2B) during the first phase $t_1$ and the second phase $t_2$;
count from the second value to the first value during the third phase $t_3$; and
set the speed of the count from the first value to the second value relative to the speed of the count from the second value to the first value based on the control-factor (in a similar way to the analogue implementation that is described above where the rate of the discharge and charge of a capacitor is set based on the control-factor).

The implementation of FIG. 3A includes a multiplexer 350 that has a multiplexer-first-input-terminal, a multiplexer-second-input-terminal, a multiplexer-control-input-terminal and a multiplexer-output-terminal.

The multiplexer-first-input-terminal receives a constant value 352, which as will be described below will set the speed with which a count is increased (in a similar way to the first current source sets the rate at which the capacitor is charged in FIG. 2A).

The multiplexer-second-input-terminal receives a zero.

The multiplexer-control-input-terminal receives a select-signal sel 356, which controls which of the multiplexer-first-input-terminal and the multiplexer-second-input-terminal is connected to the multiplexer-output-terminal. The third-phase-end-circuit 326 also includes an OR gate 358 in this example. The OR gate has two input terminals: a first input terminal that receives a signal 370 that is set high when the DC-DC converter is in the first phase $t_1$ of operation; and a second input terminal that receives a signal 372 that is set high when the DC-DC converter is in the second phase $t_2$ of operation. The output of the OR gate 358 provides the select-signal sel 356 to the multiplexer-control-input-terminal. In this way, the signal at the multiplexer-output-terminal is the constant value 352 when the DC-DC converter is in the first phase $t_1$ or the second phase $t_2$ of operation, and the signal at the multiplexer-output-terminal is zero when the DC-DC converter is in the third phase $t_3$ of operation.

The third-phase-end-circuit 326 also includes a summation block 360. The multiplexer-output-terminal is connected to an adding input of the summation block 360. A programmable control-factor p 354 is provided to a subtracting input of the summation block 360. The constant value 352 is greater than the programmable control-factor p 354. As will be described below, the programmable control-factor p 354 will set the speed with which the count is decreased (in a similar way to the second current source sets the rate at which the capacitor is discharged in FIG. 2A). The output terminal of the summation block 360 is connected to an input of a register 362. The register 362 is clocked by a clock signal 368, which has a constant frequency in this example. The register 362 has a register-output-terminal that provides a count-signal cnt 374. This count-signal cnt 374 is provided to another adding input of the summation block 360. In this way, the value of the count-signal cnt 374 is increased by the difference between the constant-value 352 and the programmable control-factor p 354 during the first phase $t_1$ and the second phase $t_2$ of operation for each cycle of the clock signal 368. The value of the count-signal cnt 374 is decreased by the programmable control-factor p 354 during the third phase $t_3$.

In this example, the constant value 352 has a positive value and the control-factor p 354 has a positive value. However, it will be appreciated that the third-phase-end-circuit 326 of FIG. 3 can be implemented in many different ways to achieve the desired functionality.

In FIG. 3A, the third-phase-end-circuit 326 includes a digital comparator 364 that compares the count-signal cnt 374 with zero or less than zero, which is the value of the count-signal cnt 374 at the start of the first phase $t_1$ in this example. If the digital comparator 364 determines that the count-signal cnt 374 is less than or equal to zero, then it triggers the third-phase-end-signal 366 (labelled as "End of $t_3$" in FIG. 3A). In the same as described above, setting the third-phase-end-signal 366 causes the controller to put the DC-DC converter into the first phase of operation and the sequence starts again.

Figure 3B:
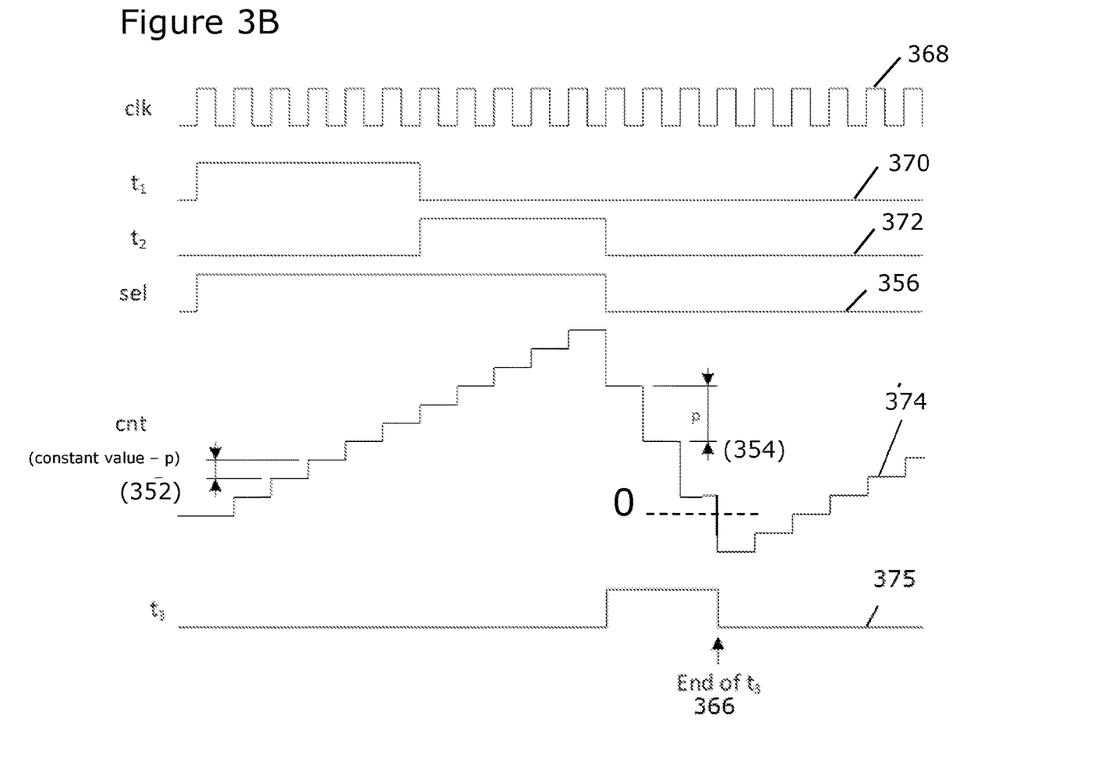
FIG. 3B shows a plot of various signals that are illustrated in FIG. 3A.

FIG. 3B shows a plot of various signals that are illustrated in FIG. 3A. Signals that are also shown in FIG. 3A have been given the same reference numbers and will not necessarily be described again with reference to FIG. 3B.

FIG. 3B shows the following signals, among others:
370, which is set high when the DC-DC converter is in the first phase $t_1$ of operation;
372, which is set high when the DC-DC converter is in the second phase $t_2$ of operation;
375, which is set high when the DC-DC converter is in the third phase $t_3$ of operation. The effect of the third-phase-end-signal 366 on the signal 375 labelled as $t_3$ is shown at the bottom of FIG. 3B, where it can be seen that the third phase ends in response to the count-signal cnt 374 returning to zero, or less than zero.

The count-signal cnt 374 is FIG. 3B also clearly indicates how the constant value 352 sets the maximum value of the count-signal cnt 374 (because the count-signal cnt 374 increases by the constant value 352 for each clock cycle 368 during the first and second phases $t_1$ and $t_2$). Then the control-factor p 354 sets the duration of the third phase $t_3$ because it controls the increment with which the count-signal cnt 374 is decreased for each clock cycle 368 until the count-signal cnt 374 returns to zero, or less than zero. Overall, this can be considered as setting the speed of the count from the first value (zero, or less than zero) to the second value (the maximum value of the count-signal cnt 374) relative to the speed of the count from the second value (the maximum value of the count-signal cnt 374) to the first value (zero, or less than zero) based on the control-factor p 354.

In the digital domain, periods t1, t2, and t3 are expressed as a discrete number of samples n1, n2, and n3. They are related as shown below:

$$t_n = n_n * T_{CLK}$$

During period n1 and n2 the cnt value starts rising until the indication that n2 has ended (indicated by the trigger of the zero current detection circuit). The value of the cnt signal is then given by:

$$cnt = (n_1+n_2)*(\text{constant\_value}-p)$$

When $t_3$ starts, cnt will count back to zero. Note that cnt crosses zero when:

$$n_3*p = (n_1+n_2)*(\text{constant\_value}-p)$$

Resulting in the expression for $n_3$:

$$n_3 = (n_1 + n_2) * \left(\frac{\text{constant\_value}}{p} - 1\right) \quad (7)$$

$$I_{AVG} = \left(\frac{p}{\text{constant\_value}}\right)\frac{I_{PEAK}}{2}$$

Again, comparing equation (7) with equation (3), it can be seen that we have realized linear current control with p/constant_value as the proportional control.

FIG. 4A shows another digital implementation of a third-phase-end-circuit 426. The functionality of various of the components of FIG. 3A is combined into an up/down counter 478 in FIG. 4.

The third-phase-end-circuit 426 of FIG. 4 includes an OR gate 458 that receives the same input signals as the OR gate of FIG. 3A; that is: a signal 470 that is set high when the DC-DC converter is in the first phase $t_1$ of operation, and a signal 472 that is set high when the DC-DC converter is in the second phase $t_2$ of operation. The output signal from the OR gate 458 is provided as a count-up signal 480 to a count-up terminal of the up/down counter 478. A NOT gate 476 is also provided that inverts the output signal from the OR gate 458 in order to provide a count-down signal 482 to a count-down terminal of the up/down counter 478.

A control-factor p 454 is provided to a count-down-value terminal of the up/down counter 478. The third-phase-end-circuit 426 also includes a subtractor 477 that subtracts the control-factor p 454 from a constant value 452, and provides the result of the subtraction to a count-up-value terminal of the up/down counter 478. As the names suggest, the values of the signals at the count-down-value terminal and the count-up-value terminal defines the amount by which the count is increased or decreased for each cycle of the clock signal 468, depending on the state of the signals at the count-up terminal and the count-down terminal.

In the same way as described above, the constant value 452 is greater than the control-factor p 454.

The output of the up/down counter 478 is a count-signal cnt 474, which is the same as the corresponding signal 474 that is described with reference to FIGS. 3A and 3B.

The third-phase-end-circuit 426 also includes a digital comparator 464 that compares the count-signal cnt 474 with zero, or less than zero. If the digital comparator 464 determines that the count-signal cnt 474 is less than or equal to zero, then it triggers the third-phase-end-signal 466 (labelled as "End of $t_3$" in FIG. 4A). Otherwise, the digital comparator 464 does not take any action and the up-down counter 478 continues to update the count-signal cnt 474 for each cycle of the clock signal 468.

Figure 4B:
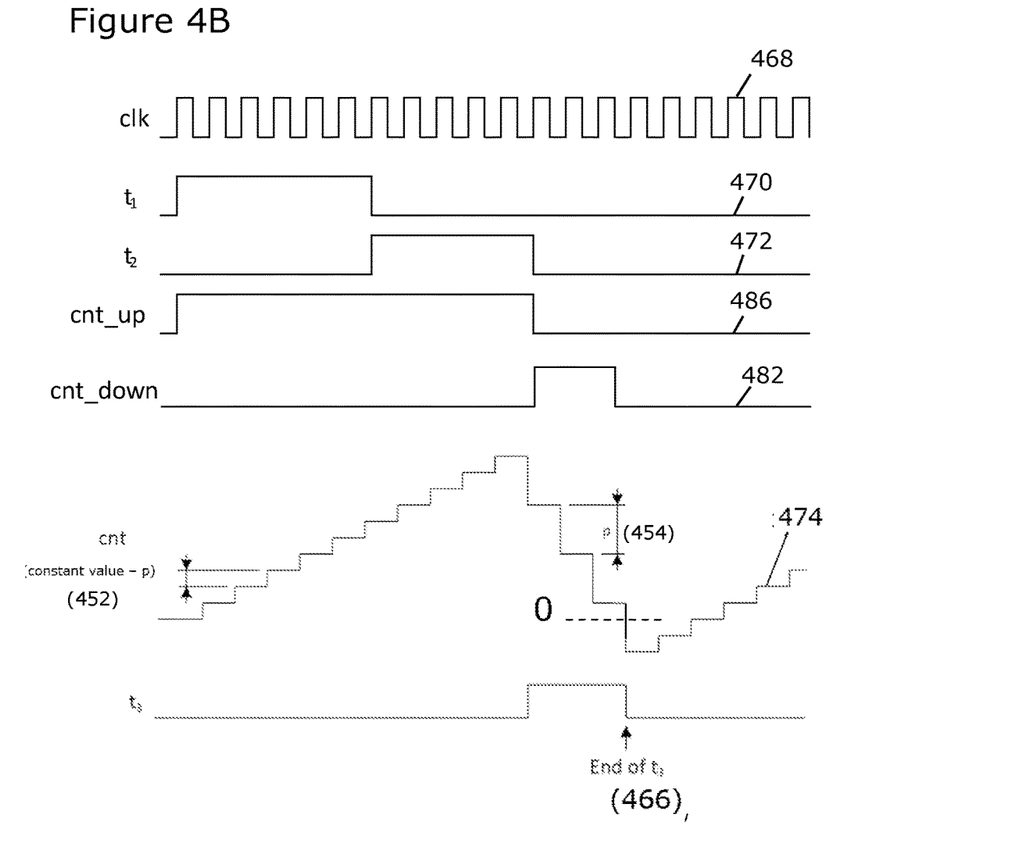
FIG. 4B shows a plot of various signals that are illustrated in FIG. 3A.

FIG. 4B shows a plot of some of the signals in the third-phase-end-circuit 426 of FIG. 4A, and further illustrate the operation of the third-phase-end-circuit 426.

The functionality of FIG. 4A can be summarised as follows:

If $t_1$ or $t_2$ is high→increment the up-down counter 478 by the difference between a constant value 452 and a programmable value p 454.

If $t_1$ and $t_2$ are low→decrement the up-down counter 478 with the programmable value p 454.

When the count-signal cnt 474 (counter value) is equal to or less than zero the complete sequence starts again.

Figure 5:
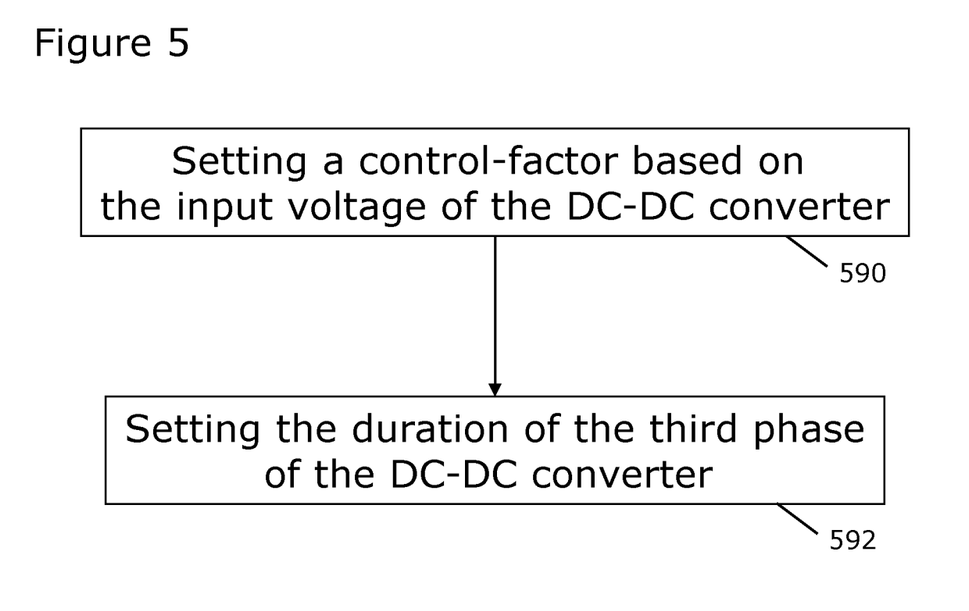
FIG. 5 schematically illustrates an example embodiment of a method of operating a DC-DC converter.

FIG. 5 schematically illustrates an example embodiment of a method of operating a DC-DC converter according to the present disclosure. In the same way as described above, the DC-DC converter includes an inductor, and the DC-DC converter has three phases of operation: (i) a first phase, in which an input voltage charges the inductor; (ii) a second phase, in which the inductor discharges to a load; and (iii) a third phase, in which the inductor is disconnected from the load, and in which the input voltage does not charge the inductor.

At step 590, the method involves setting a control-factor based on the input voltage of the DC-DC converter. As described above, this can improve the power transfer from a voltage source, especially a voltage source that can only provide a low voltage and a low current which is the case when organic matter is used to provide the input voltage.

At step 592, the method involves setting the duration of the third phase based on: the control-factor; and the sum of the duration of the first phase and the second phase. This functionality is described at length above.

The above discussion predominantly relates to use of a controller with a boost converter. However, it will be appreciated that one or more of the controllers disclosed herein can be used with other types of DC-DC converter operating in discontinuous conduction mode (DCM). For instance, controllers of the present disclosure can be used to linearize the control of input current for other types of non-linear DC-DC converter. One example of a different type of DC-DC converter that can be used is a buck converter operating in DCM. Of course, some of the equations provided above are specific to a boost converter and therefore will be different for a buck converter.

Examples described herein provide a new booster PFM based control architecture, which regulates the input current to a value proportional to a reference. The variable input current enables regulation to maximum input power by measuring the input voltage of the converter. The architecture can use a fixed peak current in combination with a dead-time that is proportional to the combined on- and off-time. This can result in linear control of the average input current without the need to sense the inductor current. This is beneficial for power efficiency as there is no need for a sense resistor in the power path. Therefore, examples disclosed herein can provide a low-power solution for MPPT architectures.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A controller for a DC-DC converter that includes an inductor, the controller comprising:
   circuitry configured to control the DC-DC converter such that the DC-DC converter includes three phases of operation:
      a first phase, in which an input voltage charges the inductor;
      a second phase, in which the inductor discharges to a load; and
      a third phase, in which the inductor is disconnected from the load, and in which the input voltage does not charge the inductor;
   wherein the controller is configured to:
      set a control-factor based on the input voltage of the DC-DC converter; and
      set the duration of the third phase, $t_3$, based on $$t_3 = \left(\frac{1}{p} - 1\right)(t_1 + t_2),$$

where p is the control-factor, $t_1$ is the duration of the first phase, and $t_2$ is the duration of the second phase.

2. The controller of claim 1, configured to set the duration of the third phase by applying a linear function to the sum of the duration of the first phase and the second phase.

3. The controller of claim 1, wherein the controller is configured to transition the DC-DC converter from the first phase to the second phase when the current through the inductor reaches a fixed peak-current value.

4. The controller of claim 1, wherein the controller is configured to transition the DC-DC converter from the second phase to the third phase in response to the current through the inductor being zero.

5. The controller of claim 1, wherein the controller is configured to operate the DC-DC converter using pulse frequency modulation control with a fixed peak current through the inductor.

6. The controller of claim 1, wherein the DC-DC converter is a boost converter.

7. The controller of claim 1, wherein the controller comprises a third-phase-end-circuit that is configured to provide a third-phase-end-signal for transitioning the DC-DC converter from the third phase to the first phase of a next cycle, wherein the third-phase-end-circuit is configured to:
   charge a capacitor from a first voltage to a second voltage during the first phase and the second phase;
   discharge the capacitor from the second voltage to the first voltage during the third phase; and
   set the rate of the discharge of the capacitor relative to the rate of the charge of the capacitor based on the control-factor.

8. The controller of claim 1, wherein the controller comprises a third-phase-end-circuit that is configured to provide a third-phase-end-signal for transitioning the DC-DC converter from the third phase to the first phase of a next cycle, wherein the third-phase-end-circuit comprises:
   a comparator having a comparator-first-input-terminal, a comparator-second-input-terminal and a comparator-output-terminal, wherein the comparator-output-terminal is configured to provide the third-phase-end-signal;
   a first current source (Iup) and a timing-switch connected in series with each other between the comparator-first-input-terminal (−) and a first supply rail;
   a second current source connected in series between the comparator-first-input-terminal and a second supply rail, wherein the controller is configured to set the level of the current provided by the second current source based on the control-factor;
   a capacitor connected in series between the comparator-first-input-terminal and the second supply rail; and
   a reference-voltage-source configured to provide a reference voltage to the comparator-second-input-terminal (+);
   wherein the controller is configured to:
      set the timing-switch such that it is conductive during the first phase and the second phase of the DC-DC converter; and
      set the timing-switch such that it is not conductive during the third phase of the DC-DC converter.

9. The controller of claim 8, wherein the first current source provides a current with a constant level.

10. The controller of claim 1, wherein the controller comprises a third-phase-end-circuit that is configured to provide a third-phase-end-signal for transitioning the DC-DC converter from the third phase to the first phase of a next cycle, wherein the third-phase-end-circuit is configured to:
  count from a first value to a second value during the first phase and the second phase;
  count from the second value to the first value during the third phase; and
  set the speed of the count from the first value to the second value relative to the speed of the count from the second value to the first value based on the control-factor.

11. The controller of claim 1, wherein organic matter is configured to provide the input voltage.

12. A system comprising:
  a DC-DC converter that includes an inductor, wherein the DC-DC converter has three phases of operation:
    a first phase, in which an input voltage charges the inductor;
    a second phase, in which the inductor discharges to a load; and
    a third phase, in which the inductor is disconnected from the load, and in which the input voltage does not charge the inductor;
  a controller configured to:
    set a control-factor based on the input voltage of the DC-DC converter; and
    set the duration of the third phase, $t_3$, based on $$t_3 = \left(\frac{1}{p} - 1\right)(t_1 + t_2),$$

where p is the control-factor, $t_1$ is the duration of the first phase, and $t_2$ is the duration of the second phase.

13. The system of claim 12, further comprising:
  organic matter that is configured to provide the input voltage.

14. The system of claim 12, wherein the controller is configured to set the duration of the third phase by applying a linear function to the sum of the duration of the first phase and the second phase.

15. A method of operating a DC-DC converter that includes an inductor, wherein the DC-DC converter has three phases of operation:
  a first phase, in which an input voltage charges the inductor;
  a second phase, in which the inductor discharges to a load; and
  a third phase, in which the inductor is disconnected from the load, and in which the input voltage does not charge the inductor;
  the method comprising;
    setting a control-factor based on the input voltage of the DC-DC converter; and
    setting the duration of the third phase, $t_3$, based on $$t_3 = \left(\frac{1}{p} - 1\right)(t_1 + t_2),$$

where p is the control-factor, $t_1$ is the duration of the first phase, and $t_2$ is the duration of the second phase.

16. The method of claim 15, wherein setting the duration of the third phase comprises:
  applying a linear function to the sum of the duration of the first phase and the second phase.

* * * * *